May 1, 1923.

W. RICHARDSON 1,453,520

HORIZONTALLY MOVING WINDOW FOR AUTOMOBILES

Filed March 30, 1920

INVENTOR
W. RICHARDSON

ATT'YS.

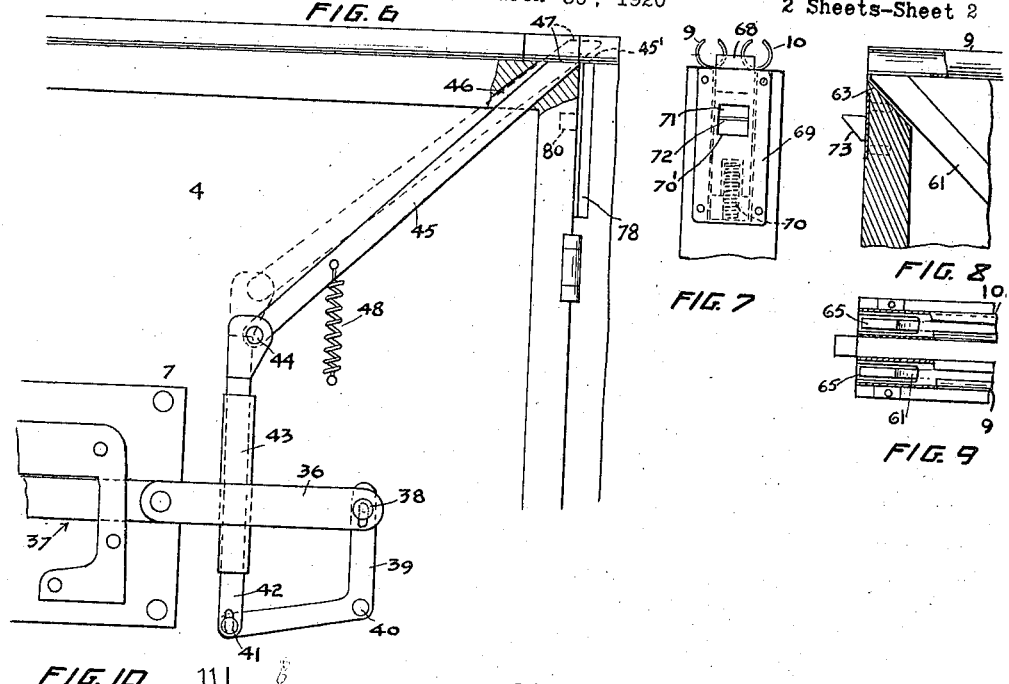

Patented May 1, 1923.

1,453,520

UNITED STATES PATENT OFFICE.

WILLIAM RICHARDSON, OF SAN FRANCISCO, CALIFORNIA.

HORIZONTALLY-MOVING WINDOW FOR AUTOMOBILES.

Application filed March 30, 1920. Serial No. 369,875.

*To all whom it may concern:*

Be it known that I, WILLIAM RICHARDSON, a citizen of the United States, residing at San Francisco, in the county of San Francisco and State of California, have invented new and useful Improvements in Horizontally-Moving Windows for Automobiles, of which the following is a specification.

This invention relates to improvements in automobile tops and more particularly to sliding side curtains or windows to be used in connection with fixed automobile tops, which tops are open on the sides thereof, whereby the automobile may be converted from an open to a closed car.

One of the objects of the invention is to provide simply constructed, inexpensive means for closing the open sides of a fixed automobile top, said closing means being in the form of windows constructed so as to be easily moved into closing position, and which, when in such position, will not rattle.

A further object of the invention is to provide means which will prevent the moving of the windows into closed position when the doors of the automobile body are open and which will likewise prevent opening of the doors when said windows are in full or partly closed position. By this arrangement, I prevent slamming or injuring, such as breaking, of the windows due to closing the doors when the windows are partly moved into closed position, and when an attempt is made to open the door with the window extended and resting upon the door.

A further object of the invention is to generally improve automobile tops of the character described, so as to render them more efficient, easy to operate, and to safeguard the windows against being broken or injured.

The invention possesses other advantages and features, some of which, with the foregoing will be set forth at length in the following description where I shall outline in full, that form of the invention which I have selected for illustration in the drawings accompanying and forming a part of the present specification. In said drawings I have shown one form of the construction of my invention but it is to be understood that I do not limit myself to such form, since the invention as expressed in the claims may be embodied in a plurality of forms.

Figure 6 is a fragmentary side elevation of the fore door of the automobile, showing the locking mechanism in side elevation and a part of the body of the automobile.

Figure 7 is a fragmentary front elevation of the side of the rear door opening in the body, to which the rear door is hinged, showing the lock attached to said side.

Figure 8 is a fragmentary vertical sectional view taken through the hinged edge of the door at the upper end thereof, showing the lock releasing means.

Figure 9 is a top plan view of the parts shown in Figure 8.

Figure 10 is a detail side elevation of the means for slidably connecting the windows with the track.

Figure 11 is a vertical sectional view taken on the line 11—11 of Figure 10.

Figure 12 is a fragmentary plan view of the front of the device showing one of the wind shield extension members.

Figure 13 is a fragmentary vertical sectional view taken through the side of the automobile, showing the window and the manner of slidably mounting the same upon the rails therefor.

Referring particularly to the drawings, 1 designates the body of an automobile and 2 the top therefor, which top, in this form is fixed and open on its sides, there being provided stationary rear windows 3, incorporated with the top. Mounted in the sides of the body 1 are the customary doors 4 and 5.

Figure 1:
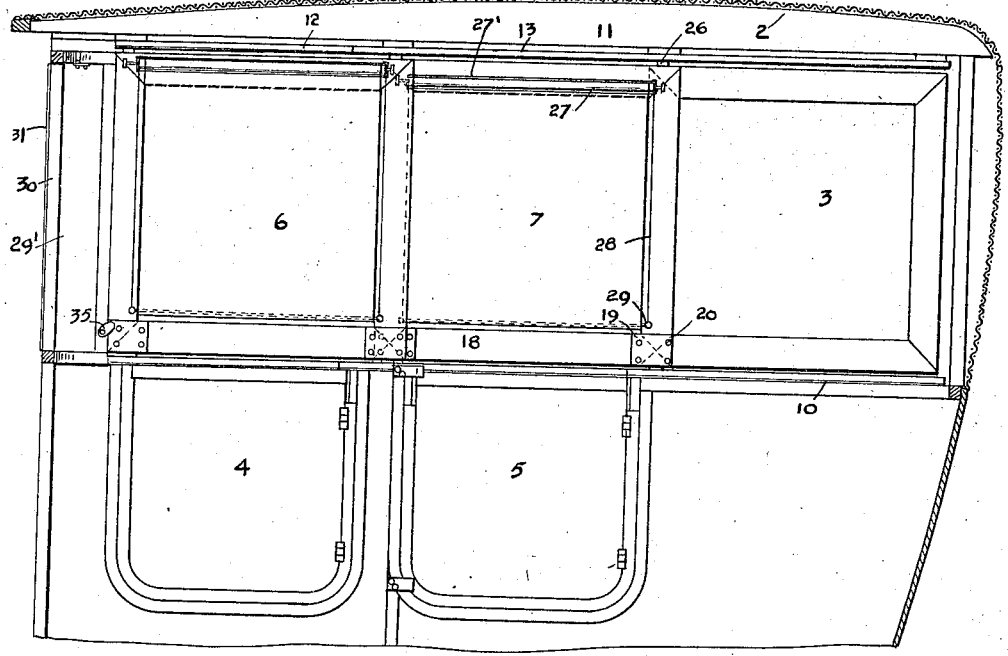
Figure 1 is a side elevation of the side and top of an automobile body, showing my invention applied thereto with the windows in closed position.
Figures 2, 3, 4, 5:
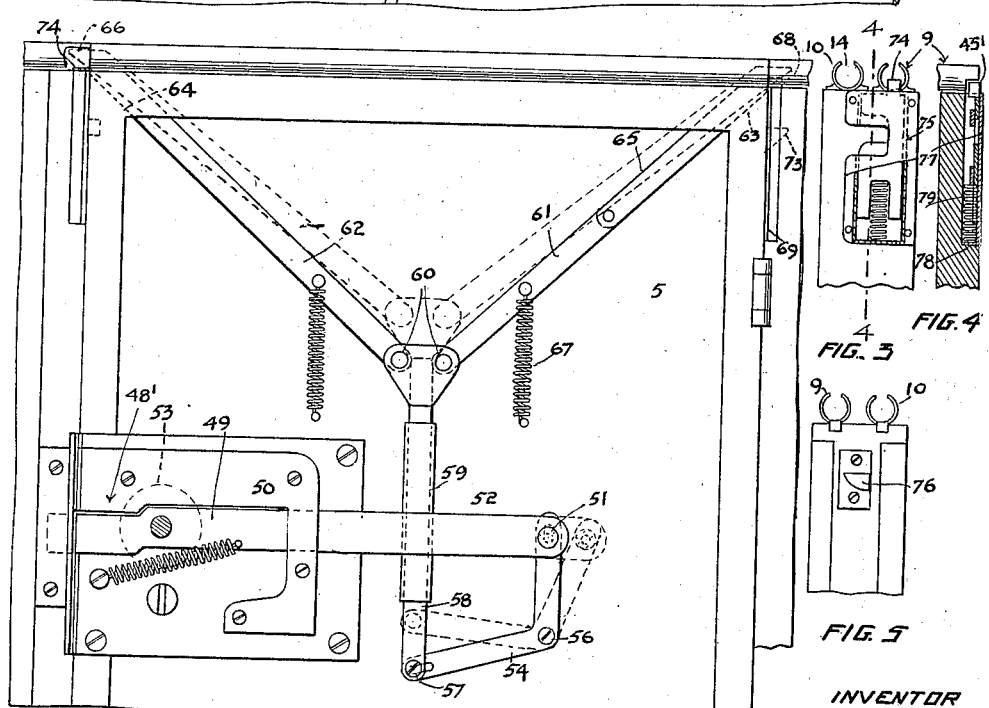
Figure 2 is an enlarged side elevation of one of the rear doors of the body of the automobile, showing part of the operating mechanism in side elevation.
Figure 3 is a fragmentary front elevation of the body of the automobile along one side of the opening therein for the door, showing parts broken away and in section.
Figure 4 is a vertical sectional view taken on the line 4—4 of Figure 3.
Figure 5 is a fragmentary end elevation, partly in section, of the free edge of the door, shown in Figure 2.

My invention comprises a front window 6 and a rear window 7 slidably mounted upon each side of the automobile so as to close the open sides thereof, said windows being operatively connected with the top 2 and the upper edge of the body 1 of the automobile. These windows are mounted so as to be moved into position, as shown in Figure 1, to close the car and when not in use, are moved to lie along the sides and inwardly of the fixed windows 3, thus leaving the sides of the automobile open.

Mounted upon the upper edge of the body 1 on each side thereof is a pair of tracks 9 and 10, and mounted upon the longitudinal frame piece 11 of the top on each side of the automobile are similar tracks 12 and 13. The windows are slidably mounted in these tracks. The track 9 being the innermost track of each pair, extends the full length of the side of the body and provides for movement of the front window 6 into position to close the front part of the side of the car. The outer track 10 terminates at a point slightly forwardly of the rear edge of the front window when the latter is in position. The track 12 is extended for the full length on each side as does the track 9 and the track 13 is arranged to correspond with the track 10. The tracks 9 and 10 extend in sections over the tops of the doors 4 and 5, said sections aligning with the portions of the tracks mounted on the fixed parts of the body. Each track is preferably tubular, there being provided an opening or slot 14 extending along the top thereof. On the under side of each window, at the ends thereof, are mounted guide members 15 which are slidably mounted in the tracks and at their lower ends are of greater diameter than the width of the openings or slots 14, so as to prevent the windows from moving out of the tracks if moved vertically. The guide members 15 extend upwardly into recesses 16 formed in the window frame 18, said recesses being enclosed by plates 19 secured by fastening elements 20 to the sides of the window frame. The guide members are adapted to move vertically through guide blocks 21 therefor mounted in the recesses 16 and these guide blocks are held within the recesses by suitable fastening means 22 and are spring pressed as at 22' so as to be prevented from rattling. The upper ends of the members 15 are enlarged, as at 23, and slidably engage the plates 19. Expansion springs are mounted between the enlarged portions 23 and the upper walls of the recesses 16 and exert a tendency to push downwardly on the members 15 at all times. By this construction, the windows are prevented from rattling.

A preferably flexible cable or other suitable element 24 is connected with the lower ends of the members 15 and is slidably mounted with the tracks 9 and 10. Along the upper edges of the windows at spaced points are mounted guide members 26 which slide within the tracks 12 and 13.

I preferably mount a roller curtain or shade 27 within a groove or counter-sink 27' formed longitudinally in the horizontal portion of the frame 18 of each window. By counter-sinking the roller curtain, it is possible to slide the windows thereon back and forth without having the curtain interfere with this movement. The curtains are guided in their up and down movement by the guide elements 28 mounted on opposite sides of the sash frame and which extend through eyes 29 mounted on the lower ends of the shades.

The upper edges of the body of the automobile and doors 4 and 5 having strips 28' secured thereto on opposite sides of the tracks 9 and 10, said strips being rounded on their upper faces and nearly covering the tracks. These strips project above and protect the tracks against being bent or otherwise deranged. The members 15 work between opposite faces of the strips 28'. As shown in Figure 12, I may provide hinged and curved wind shield extensions 29', each comprising a frame 30 hinged at its forward edge, as at 31, to the sides of the wind shield of the automobile, there being glass panes mounted in said frame. These extensions are also connected with the top of the automobile by a slotted link 33 and a screw 34, which latter is received in the slot and adjustably secures said link to the top. By means of a suitable latch 35, I provide for securing the extension in position to aline with the forward edge of the front window 6.

I provide means for preventing movement of either window into position to enclose the automobile when either or both doors are open, and for preventing opening of the door when the windows are in full or partly extended position.

This means includes mechanism operatively associated with the fore door 4 so as to prevent the front window from being pushed into position at the time that the fore door is being opened and also after being opened. This means on the fore door comprises a bar 36 connected with the door latch mechanism 37 so as to be moved upon operation of said latch mechanism. The bar 36 is connected at its other end, as as 38, with one end of a bell crank 39, the latter being pivoted, as at 40, to the fore door. The bell crank is pivoted, as at 41, to the lower end of the slide rod 42. The slide rod is vertically adjustably mounted within a guide 43 fixed to the door. This rod 42 is pivotally connected to a detent bar 45. The detent bar extends upwardly and through an opening 46 at the upper edge of the door, the upper end of said bar being provided with an angularly projecting abutment 47. The opening 46 registers with the track 9 and the abutment 47 normally lies below said track in said opening. When the latch mechanism 37 is operated to open the door, the bell crank 39 is rocked so that the rod 42 is pushed upwardly and the bar 45 is moved upwardly to extend the abutment 47 into the track 9. The abutment thus projected acts to prevent movement of the front window 9 into the path of the door when the latter is being opened. There is provided a retractile spring 48 connected at its ends to the door and the lever 45 so as to return the lever 45 and co-operating mechanism to normal position. The hinged edge of the door 4 and opposed edge of the body of the car at their upper ends are provided with a locking device 45' which acts to prevent movement of the front window into the path of the door 4 when the latter is open. This mechanism will be later more fully described.

The main door 5 is provided with means similar to the door 4 for preventing operation of the windows and the door as hereinbefore noted. On this door is provided latch mechanism 48', the bolt 49 which is connected, as at 51, with a bell crank 54. By operating the latch handle 53, the bolt 49 rocks the bell crank 54 with which it is connected, said bell crank being pivoted, as at 56, to the door. The other end of the bell crank 54 is pivotally connected, as at 57, with the lower end of a vertical slide rod 58. The rod 58 is mounted in a guide sleeve 59 secured to the door and at its upper end is pivotally connected, as at 60, with detent bars 61 and 62 which bars extend upwardly and outwardly to the upper edges of the door. These bars 61 and 62 are adapted to extend through openings 63 and 64 formed in the upper edge of the door, said openings registering with openings formed in the lower side of the tracks 9 and 10. On the upper end of the member 61 there is provided a pair of abutments 65 adapted to project into the tracks 9 and 10 when the latch mechanism 48' is operated to open the door. A single abutment 66 is provided on the upper edge of the member 62 and is adapted to likewise project into the track 9 when the door is opened by the latch mechanism 49. Retractile springs 67 are connected at their ends with the door 7 and members 61 and 62 so as to return the mechanism to normal position. By provision of this mechanism, the tracks 9 and 10 are blocked when the latch mechanism is turned to open the door, as the guide members of the windows sliding in the tracks 9 and 10 will engage said abutment and be prevented from being moved on to the sections of the tracks carried by the door. This arrangement is necessary in order to prevent a person within the automobile from attempting to push out the window at the same time the door is being opened. Mounted on each side of the door frame for the door 5, in the body of the automobile is means for preventing movement of the windows into extended position when the door is open, said means also preventing movement of the front window when in position, on to the track sections of the door 5. This means comprises on the hinged side of the door, an abutment plate 68 vertically slidably mounted in a casing 69, which latter is secured to the upper edge of the door frame. This member 68 is normally held upwardly to extend in the path of the guide members 15 in the tracks 9 and 10, by an expansion spring 70 mounted in the casing 69. This member 68 thus extended prevents movement of the windows into the path of the door. The casing 69 is provided with an opening 70' therein, which registers with an opening 71 formed in the plate 68, the lower edge of said opening 71 being bevelled, as at 72. The opposite edge of the door is provided with a bevelled projection 73, which projection, when the door is closed, engages in the opening 71 and forces and holds said member 68 in down position out of the path of said guides 15. Thus, when the door is closed, the member 68 offers no obstruction to the movement of the windows in the tracks but upon opening the door said member is moved into up position by the spring 70 and the windows cannot be extended. The opposite edge of the door frame is provided with a single abutment plate 74 instead of one which projects into both tracks, said abutment 74 extending into the track 9 only. The abutment 74 is operated by mechanism 75 similar to the mechanism for operating the abutment 68, there being provided on the edge of the door a projection 76, which operates the abutment plate 74. With this arrangement, the front window cannot be moved from extended position into the path of the door when the latter is opened.

The mechanism 45' on the fore door is identical with the abutment plate 74 and its operating mechanism and consists of an abutment plate 77 sliding in a casing 78 on the door frame. The plate 77 is held in up position by a spring 79, the projection 80 on the door 4 operating through an opening in the casing 78 and engaging in an opening on the plate holds the plate 77 depressed when the door is closed.

When the windows are fully or partly extended, that is, when the windows are disposed over the openings in the doors through which the abutment 47 for the fore door and the abutments 65 and 66, extend it is impossible to release the latch mechanisms for the doors. This is due to the fact that in operating the latch mechanism to open the doors, said abutments are caused to project into the path of the tracks and must so project in order to release the latch mechanism. Thus, when the windows are in position, they will prevent such projection of the abutments and the latch mechanism cannot be operated to open the door. It will thus be seen that these abutments not only serve to prevent movement of the windows into extended position simultaneously with the opening of the doors, but will prevent unlatching and attempted opening of the doors when the windows are partly or fully extended.

I claim:—

1. The combination with the body of an automobile having doors in the sides thereof, and a top for said automobile, open at its sides, of windows mounted between the top and body and adapted to be extended to close said open sides, tracks for said windows mounted upon the upper edges of the body and doors, similar tracks mounted upon the top, means carried by the windows slidable in said tracks, and means for automatically presenting an obstruction in the path of the windows at the end of the body carried tracks to prevent movement of said windows into the path of the door, when said doors are open.

2. In combination with the body of an automobile, doors mounted in the sides of the body, and a top of said automobile, said top being open on its side, of windows mounted between the body and top and adapted to be extended to close the open sides of the top, tracks extending along the upper edges of the body and doors, similar tracks secured to the top, means carried by said windows slidably engaging in said tracks, an abutment member mounted on the body, and adapted to extend in the tracks in the path of said means, a spring for normally urging said abutment member into said tracks, and means carried by the door for engaging said abutment member and holding it in retracted position out of the tracks while the door is closed and permitting said abutment member to extend into the tracks when the door is opened.

3. In combination with the body of an automobile, doors mounted in the sides of the body, and a top for said automobile, said top being open on its side, of windows mounted between the body and top and adapted to be extended to close the open sides of the top, tracks extending along the upper edges of the body and doors, similar tracks secured to the top, means carried by said windows slidably engaging in said tracks, an abutment member mounted on the body, and adapted to extend in the tracks in the path of said means, a spring for normally urging said abutment member into said tracks, and means carried by the door for engaging said abutment member and holding it in retracted position out of the tracks while the door is closed and permitting said abutment member to extend into the tracks when the door is opened, latch mechanisms for the doors, and means operating when said latch mechanism is actuated to extend into said tracks in the path of said first-named means.

WILLIAM RICHARDSON.